(12) United States Patent
Hara

(10) Patent No.: US 11,227,115 B2
(45) Date of Patent: Jan. 18, 2022

(54) INFORMATION PROCESSING APPARATUS, INFORMATION PROCESSING METHOD, AND NON-TRANSITORY COMPUTER-READABLE MEDIUM STORING INFORMATION PROCESSING PROGRAM

(71) Applicant: NEC Corporation, Tokyo (JP)

(72) Inventor: Akihiro Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 4 days.

(21) Appl. No.: 17/101,651

(22) Filed: Nov. 23, 2020

(65) Prior Publication Data

US 2021/0165961 A1 Jun. 3, 2021

(30) Foreign Application Priority Data

Nov. 29, 2019 (JP) .............................. JP2019-216656

(51) Int. Cl.
*G06F 17/00* (2019.01)
*G06F 40/284* (2020.01)
*G06K 9/00* (2006.01)
*G06F 40/103* (2020.01)

(52) U.S. Cl.
CPC .......... *G06F 40/284* (2020.01); *G06F 40/103* (2020.01); *G06K 9/00463* (2013.01)

(58) Field of Classification Search
CPC .. G06F 40/284; G06F 40/103; G06K 9/00463
See application file for complete search history.

(56) References Cited

U.S. PATENT DOCUMENTS

| 2009/0182727 A1* | 7/2009 | Majko | G06F 16/9535 |
| 2011/0131207 A1* | 6/2011 | Jonsson | G06Q 10/107 707/730 |
| 2012/0030368 A1* | 2/2012 | John | G06F 16/951 709/231 |
| 2014/0195950 A1* | 7/2014 | Diament | G06F 16/34 715/771 |

(Continued)

FOREIGN PATENT DOCUMENTS

JP 2012-212254 A 11/2012

OTHER PUBLICATIONS

Coppersmith, Glen et al., "Dynamic Wordclouds and Vennclouds for Exploratory Data Analysis," 2014, Proceedings of the Workshop on Interactive Language Learning, Visualizations, and Interfaces, pp. 22-29 (Year: 2014).*

(Continued)

*Primary Examiner* — Andrew T McIntosh
(74) *Attorney, Agent, or Firm* — Sughrue Mion, PLLC

(57) ABSTRACT

The present disclosure can provide an information processing apparatus capable of increasing the amount of information that can be displayed. The information processing apparatus according to an aspect of the present disclosure includes: a morpheme analysis unit that analyzes a morpheme group included in a document; an importance degree calculation unit that calculates a degree of importance of the morpheme group; and a display period determination unit that determines, based on the degree of importance of the morpheme group, a display period of the morpheme group when the morpheme group is displayed on a display unit.

14 Claims, 23 Drawing Sheets

(56) References Cited

U.S. PATENT DOCUMENTS

2014/0229159 A1* 8/2014 Branton ................ G06F 16/345
 704/9
2020/0151264 A1* 5/2020 Tseng ................ G06F 16/24578

OTHER PUBLICATIONS

Hearst, Marti A. et al., "An Evaluation of Semantically Grouped Word Cloud Designs," IEEE, pp. 2748-2761. (Year: 2019).*

* cited by examiner

INFORMATION PROCESSING APPARATUS, INFORMATION PROCESSING METHOD, AND NON-TRANSITORY COMPUTER-READABLE MEDIUM STORING INFORMATION PROCESSING PROGRAM

INCORPORATION BY REFERENCE

This application is based upon and claims the benefit of priority from Japanese patent application No. 2019-216656, filed on Nov. 29, 2019, the disclosure of which is incorporated herein in its entirety by reference.

TECHNICAL FIELD

The present disclosure relates to an information processing apparatus, an information processing method, and a non-transitory computer readable medium storing an information processing program.

BACKGROUND ART

When a user wants to understand what kind of contents are contained in a document, a method for dividing the document into morphemes, changing the character size in accordance to the degree of importance of each morpheme, such as a frequency of appearance, and displaying the morphemes on a display unit can be used. For example, in the information processing method disclosed in Japanese Unexamined Patent Application Publication No. 2012-212254, the amount of information that can be displayed on a display unit is increased by making the character size of a morpheme of which the degree of importance is low smaller than that of a morpheme of which the degree of importance is high. It should be noted the "document" means a document used in the field of natural language processing and is a collection of a plurality of sentences.

In the information processing method disclosed in Japanese Unexamined Patent Application Publication No. 2012-212254, in order to make the morphemes easily visible to a user, the character size of a morpheme to be displayed must be equal to or larger than the minimum character size which does not make it difficult for the user to see the morpheme, and thus there are limitations to the amount of information that can be displayed.

SUMMARY

One of the objects to be attained by example embodiments disclosed herein is to provide an information processing apparatus, an information processing method, and a non-transitory computer readable medium storing an information processing program that contribute to solving the above problem. Note that the above-described object is merely one of the objects to be attained by the example embodiments disclosed herein. Other objects or problems and novel features will be made apparent from the following description and the accompanying drawings.

An information processing apparatus according to a first aspect of the present disclosure includes:
 a morpheme analysis unit configured to analyze a morpheme group included in a document;
 an importance degree calculation unit configured to calculate a degree of importance of the morpheme group; and
 a display period determination unit configured to determine, based on the degree of importance of the morpheme group, a display period of the morpheme group when the morpheme group is displayed on a display unit.

An information processing method according to a second aspect of the present disclosure includes:
 analyzing a morpheme group included in a document;
 calculating a degree of importance of the morpheme group; and
 determining, based on the degree of importance of the morpheme group, a display period of the morpheme group when the morpheme group is displayed on a display unit.

A non-transitory computer readable medium storing an information processing program according to a third aspect of the present disclosure causes a computer to:
 analyze a morpheme group included in a document;
 calculate a degree of importance of the morpheme group; and
 determine, based on the degree of importance of the morpheme group, a display period of the morpheme group when the morpheme group is displayed on a display unit.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENTS

Hereinafter, the best mode for carrying out the present disclosure will be described with reference to the accompanying drawings. However, the present disclosure is not limited to the following example embodiments. Further, for the clarification of the explanation, the following description and the drawings are simplified as appropriate.

First Example Embodiment

Figure 1:
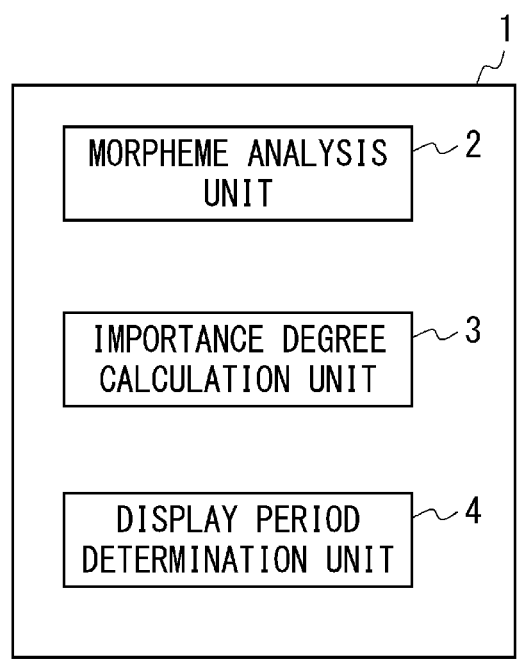
FIG. 1 is a block diagram of an information processing apparatus according to a first example embodiment.

First, a configuration of an information processing apparatus according to this example embodiment is described. FIG. 1 is a block diagram of the information processing apparatus according to this example embodiment. As shown in FIG. 1, an information processing apparatus 1 includes a morpheme analysis unit 2, an importance degree calculation unit 3, and a display period determination unit 4. The morpheme analysis unit 2 analyzes, for example, a morpheme group included in a document input by a user. Here, the morpheme group is a subgraph formed from a co-occurrence frequency calculated based on individual morphemes acquired by dividing the document, or based on the document and individual morphemes acquired by dividing this document as will be described later. Note that as a method for analyzing morphemes, general methods such as kuromoji and Mecab can be used, but any method in which morphemes can be analyzed from a document may instead be used.

The importance degree calculation unit 3 calculates a degree of importance of the analyzed morpheme group. The degree of importance of a morpheme is, for example, a value set by a user for each morpheme, or a value determined by machine learning in which the degree of importance of the morpheme having a high frequency of appearance is set to be high by referring to a value which can be statistically calculated, such as a frequency of appearance, a Document Frequency (DF), a Term Frequency-Inverse Document Frequency (TF-IDF), and a co-occurrence frequency, and a user's log. When the morpheme group is a subgraph, the degree of importance of the morpheme group may be set to an average value, a maximum value, or a minimum value of the degree of importance of each morpheme included in the subgraph. The display period determination unit 4 determines, based on the calculated degree of importance of the morpheme group, a display period of the morpheme group when the morpheme group is displayed on a screen of a display unit. For example, the display period determination unit 4 determines the display period of the morpheme group in the following manner: the higher the degree of importance of the morpheme group is, the longer it becomes. Here, the "display period" is a period from when the morpheme group is displayed at a desired position on the screen of the display unit to when the morpheme group disappears from the screen. Note that the display period determination unit 4 may determine a display order of not all but just some of the morpheme groups in the above manner; namely, the higher the degree of importance of a morpheme group, the longer it becomes.

Figure 2:
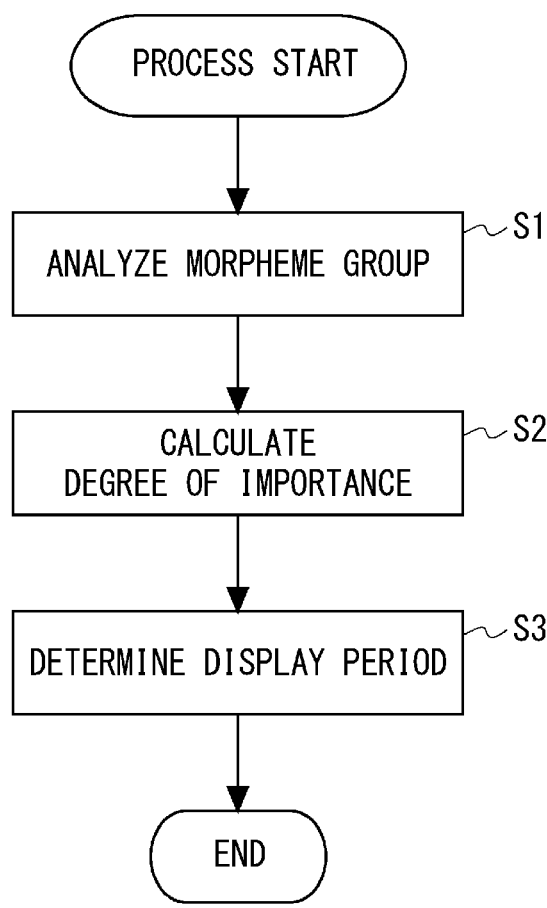
FIG. 2 is a flowchart showing a flow of processes performed in an information processing method according to the first example embodiment.

Next, an information processing method according to this example embodiment is described. FIG. 2 is a flowchart showing a flow of processes performed in the information processing method according to this example embodiment. First, the morpheme analysis unit 2 analyzes a morpheme group included in a document input by a user (S1). Next, the importance degree calculation unit 3 calculates a degree of importance of the analyzed morpheme group (S2). Then, the display period determination unit 4 determines, based on the calculated degree of importance of the morpheme group, a display period of the morpheme group when the morpheme group is displayed on the screen of the display unit (S3).

As described above, the information processing apparatus 1 and the information processing method according to this example embodiment determine, based on the degree of importance of the morpheme group, a display period of the morpheme group when the morpheme group is displayed on the screen of the display unit. Therefore, for example, by reducing the display period of a morpheme group of which the degree of importance is relatively low, it is possible to newly display a morpheme group of which the degree of importance is low that cannot be displayed by the information processing method disclosed in Japanese Unexamined Patent Application Publication No. 2012-212254. Thus, the information processing apparatus 1 and the information processing method according to this example embodiment can increase the amount of information that can be displayed on the screen of the display unit as compared with the information processing method disclosed in Japanese Unexamined Patent Application Publication No. 2012-212254.

Second Example Embodiment

Figure 3:
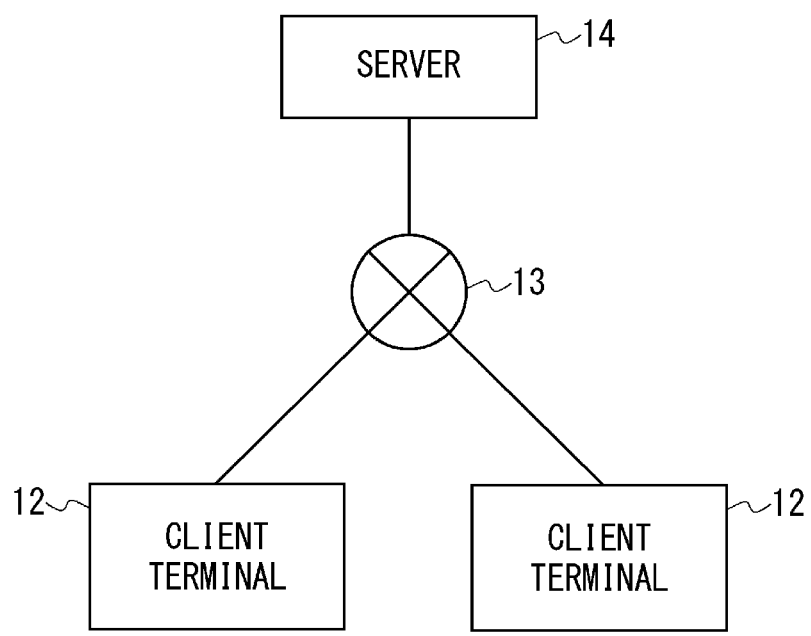
FIG. 3 is a block diagram of a morpheme group display system using an information processing apparatus according to a second example embodiment.

FIG. 3 is a block diagram of a morpheme group display system using an information processing apparatus according to this example embodiment. As shown in FIG. 3, a morpheme group display system 11 includes a client terminal 12, a network 13, and a server 14. The client terminal 12 is, for example, a notebook Personal Computer (PC), a smartphone, or a tablet to which a document is input by a user, and includes a display unit for displaying a morpheme group. The client terminal 12 is connected to the server 14 via the network 13.

Figure 4:
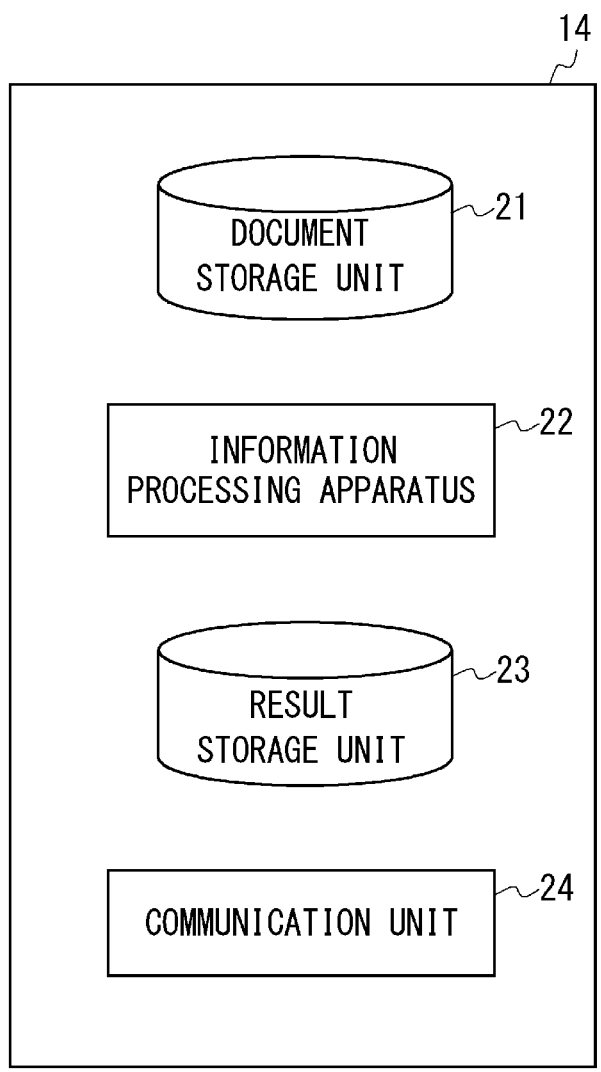
FIG. 4 is a block diagram of a server of the morpheme group display system according to the second example embodiment.

FIG. 4 is a block diagram of the server of the morpheme group display system according to this example embodiment. As shown in FIG. 4, the server 14 includes a document storage unit 21, an information processing apparatus 22, a result storage unit 23, and a communication unit 24. The document storage unit 21 stores document data indicating the document transmitted from the client terminal 12. At this time, the document data is associated with terminal data of the client terminal 12 to which the document is input.

The information processing apparatus 22 calculates a degree of importance of the morpheme group included in the document indicated by the document data and determines a display period and the like of the morpheme group based on the calculated degree of importance, the details of which will be described later. Then, the information processing apparatus 22 outputs result data indicating the result obtained by the determination to the result storage unit 23. At this time, the result data is associated with terminal data indicating the client terminal that has transmitted the document data.

The result storage unit 23 stores the result data input from the information processing apparatus 22. The communication unit 24 transmits the result data to the client terminal 12 to which the analyzed document is input based on the terminal data of the result data stored in the result storage unit 23.

Figure 5:
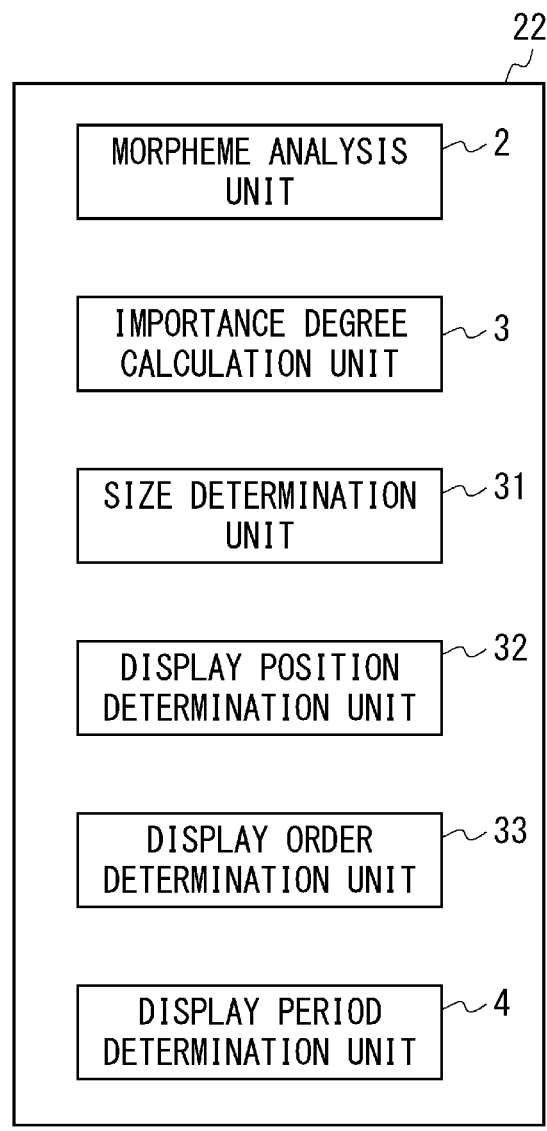
FIG. 5 is a block diagram of the information processing apparatus according to the second example embodiment.

Next, the information processing apparatus according to this example embodiment is described. FIG. 5 is a block diagram of the information processing apparatus according to this example embodiment. The information processing apparatus 22 has a configuration similar to that of the information processing apparatus 1 according to the first example embodiment, but the configuration of the information processing apparatus 22 is more preferable to that of the information processing apparatus 1. Note that in the following description of the second example embodiment, parts of the description thereof that are redundant with respect to those of the first example embodiment will be omitted, and elements the same as those of the information processing apparatus 1 according to the first example embodiment will be referred to by reference symbols the same as those by which the elements of the information processing apparatus 1 are referred to.

As shown in FIG. 5, the information processing apparatus 22 includes a size determination unit 31, a display position determination unit 32, and a display order determination unit 33 in addition to the morpheme analysis unit 2, the importance degree calculation unit 3, and the display period determination unit 4. For the clarification of the explanation, the information processing apparatus 22 according to this example embodiment processes individual morphemes that are not formed into the subgraph as a morpheme group.

For example, the size determination unit 31 determines a character size (i.e., a font size) of the morpheme based on the calculated degree of importance of the morpheme in the following manner: the higher the degree of importance of the morpheme is, the larger it becomes. For example, the display position determination unit 32 determines a display position of the morpheme based on the calculated degree of importance of the morpheme in the following manner: the higher the degree of importance of the morpheme is, the closer it is to the center of the screen or determines a display style of the morpheme (e.g., the direction in which the morpheme is moved or a pop-up display). For example, the display order determination unit 33 determines a display order of the morphemes based on the respective calculated degrees of importance of the morphemes in the following manner: the higher the degree of importance of the morpheme is, the earlier the morpheme is displayed.

Figure 6:
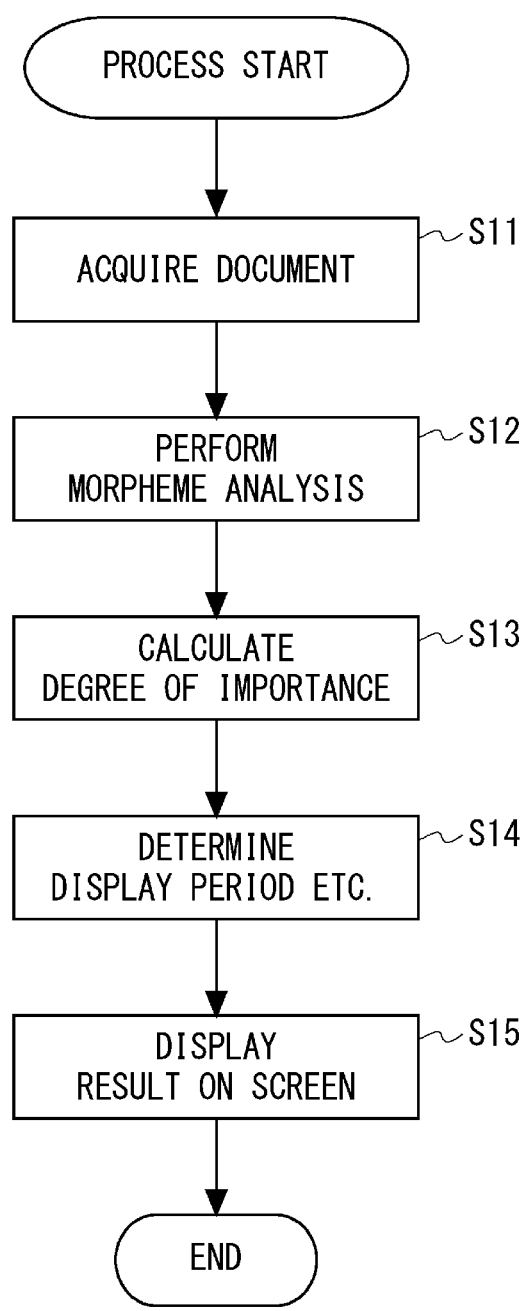
FIG. 6 is a flowchart showing a flow of displaying morphemes by using the morpheme group display system according to the second example embodiment.

Next, a flow of displaying morphemes by using the morpheme group display system 11 according to this example embodiment is described. FIG. 6 is the flowchart showing the flow of displaying morphemes by using the morpheme group display system 11 according to this example embodiment. First, when a user requests a display of morphemes via the client terminal 12, the morpheme analysis unit 2 acquires document data that is stored in the document storage unit 21 of the server 14 and that indicates a document transmitted from the client terminal 12 (S11).

Next, the morpheme analysis unit 2 performs a morpheme analysis on the document indicated by the acquired document data (S12). Next, the importance degree calculation unit 3 calculates a degree of importance for each morpheme divided by the morpheme analysis (S13). Then, a display period and the like of the morpheme are determined for each morpheme based on the calculated degree of importance of the respective morphemes (S14).

Figure 7:
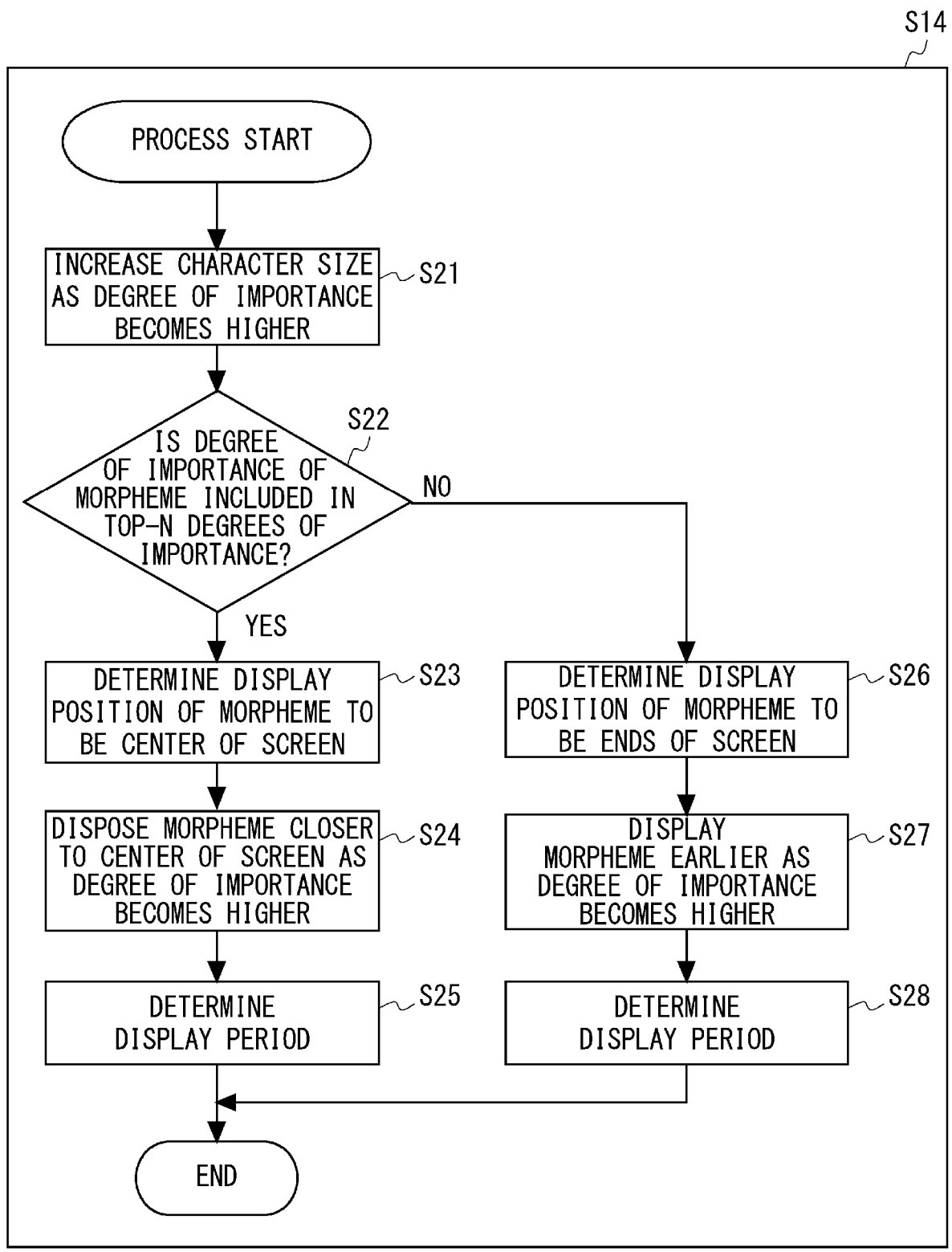
FIG. 7 is a flow chart showing a flow of determining a display period and the like of the morpheme.
Figure 8:
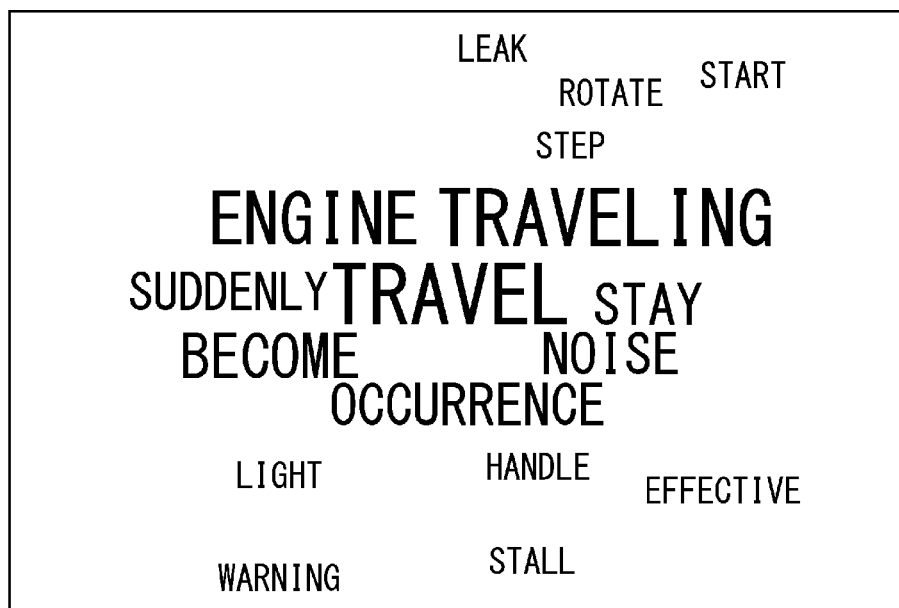
FIG. 8 is a diagram illustrating a movement of the morpheme displayed on a screen of a display unit.
Figure 9:
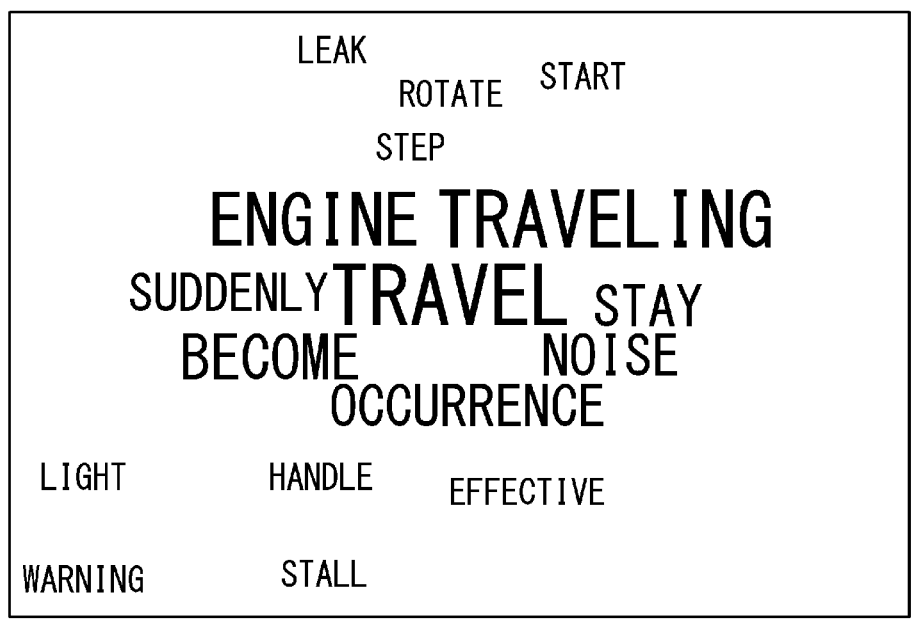
FIG. 9 is a diagram illustrating the movement of the morpheme displayed on the screen of the display unit.
Figure 10:
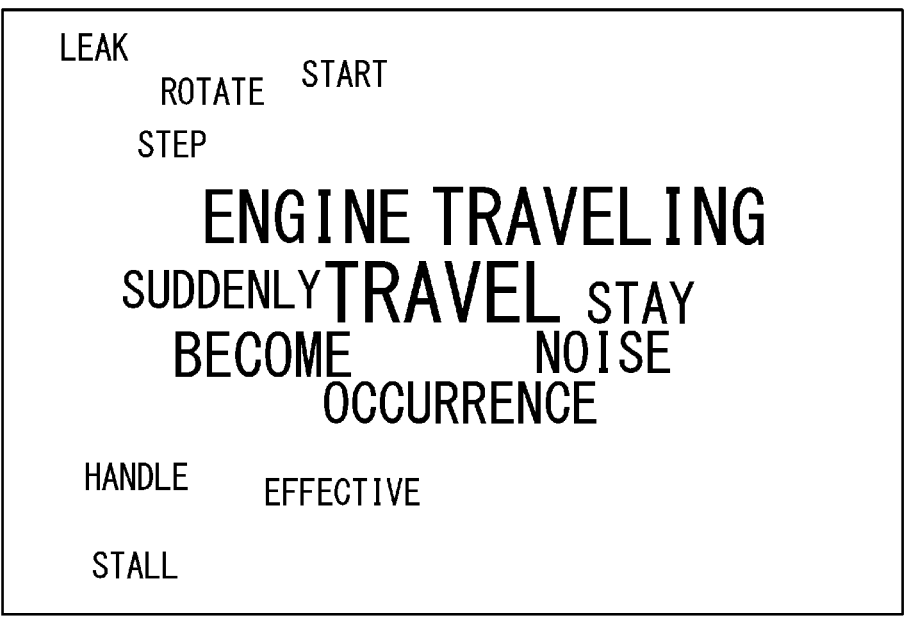
FIG. 10 is a diagram illustrating the movement of the morpheme displayed on the screen of the display unit.
Figure 11:
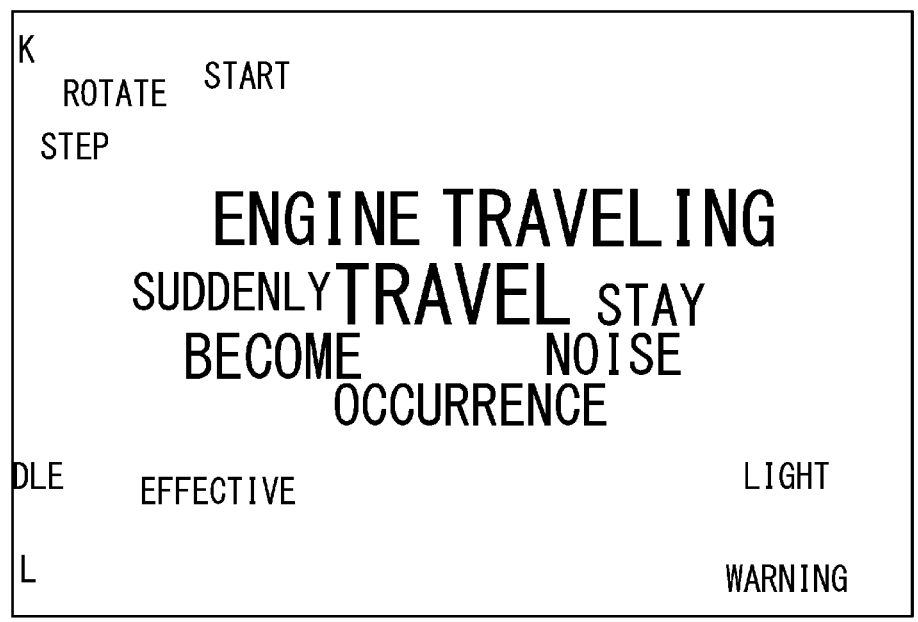
FIG. 11 is a diagram illustrating the movement of the morpheme displayed on the screen of the display unit.

Here, a specific flow of Step S14 for determining a display period and the like of the morpheme is described. FIG. 7 is a flow chart showing a flow of determining a display period and the like of the morpheme. First, the size determination unit 31 determines a character size of the morpheme based on the calculated degree of importance of the morpheme in the following manner: the higher the degree of importance of the morpheme is, the larger it becomes (S21). For example, when the degree of importance of the morpheme is defined as X, the size determination unit 31 determines the character size to be 4 X. However, the coefficient of 4 may be determined in accordance with the screen size of the display unit of the client terminal 12. Further, a calculation formula of the character size is not only linearly proportional to the degree of importance of the morpheme, but may also take logarithms or roots.

Next, the display position determination unit 32 determines whether the calculated degree of importance of the morpheme is included in the top-N degrees of importance of the morphemes (S22), and if it is determined that the calculated degree of importance of the morpheme is included in the top-N degrees of importance of the morphemes (YES in S22), the display position determination unit 32 determines a display position of this morpheme to be the center of the screen (S23). In this example, N can be set to 30, but N can be appropriately changed in accordance with the screen size of the display unit of the client terminal 12.

Next, the display position determination unit 32 determines the display position of each morpheme of which the degree of importance is included in the top-N degrees of importance of the morphemes based on this degree of importance of each morpheme in the following manner: the higher the degree of importance of the morpheme is, the closer it is displayed to the center of the screen of the display unit (S24). Then, the display period determination unit 4 determines a display period of each morpheme of which the degree of importance is included in the top-N degrees of importance of the morphemes so that it is always displayed on the screen of the display unit of the client terminal 12 (S25). That is, the display period determination unit 4 determines the display period of each morpheme of which the degree of importance is included in the top-N degrees of importance of the morphemes so that it is continuously displayed.

Meanwhile, if it is determined that the calculated degree of importance of the morpheme is not included in the top-N degrees of importance of the morphemes (NO in S22), the display position determination unit 32 determines the display position of this morpheme to be the ends of the screen of the display unit, and determines a display style of the morpheme, for example, the direction in which the morpheme is moved on the screen of the display unit (S26).

Next, the display order determination unit 33 determines, based on the respective degrees of importance of the morphemes that are not included in the top-N degrees of importance of the morphemes, a display order of the morphemes in the following manner: the higher the degree of importance of the morpheme is, the earlier the morpheme is displayed (S27). Then, the display period determination unit 4 determines a display period of each of the morphemes that are not included in the top-N degrees of importance of the morphemes from when it appears from one end of the screen of the display unit of the client terminal 12 to when it disappears at the other end thereof (S28). At this time, the display period determination unit 4 determines, based on the degrees of importance of the morphemes that are not included in the top-N degrees of importance of the morphemes, the display period of each of the morphemes in the following manner: the higher the degree of importance of the morpheme is, the slower the morpheme is moved. In other words, the display period determination unit 4 determines a moving speed of the morpheme.

Result data indicating the character size, the display position, the display style, the display order, and the display period of the morpheme determined as described above is transmitted to the client terminal 12 via the communication unit 24. Then, based on the result data, the client terminal 12 displays the morpheme on the screen of the display unit, for example, as follows (S15).

Each of FIGS. 8 to 11 is a diagram illustrating a movement of the morpheme displayed on the screen of the display unit. For example, as shown in FIGS. 8 to 11, "engine" and the like, which are the morphemes of which the degree of importance is included in the top-N degrees of importance of the morphemes, are disposed at substantially the center of the screen of the display unit. The aforementioned morphemes of which the degree of importance is included in the top-N degrees of importance of the morphemes are not moved (i.e., they are always displayed), and "travel" of which the degree of importance is higher than that of "engine" is disposed closer to the center of the screen of the display unit than "engine" is.

Meanwhile, "leak" and the like, which are morphemes of which the degree of importance is not included in the top-N degrees of importance of the morphemes, are disposed at the upper end or the lower end of the screen of the display unit. Then, at the time of starting the display the morphemes of which the degree of importance is included in the top-n degrees of the morphemes of which the degree of importance is not included in the top-N degrees of importance of the morphemes, which are "leak" and the like, are displayed on the screen of the display unit. Note that n can be appropriately changed in accordance with the screen size of the display unit of the client terminal 12.

After that, these morphemes are moved toward the left end of the screen of the display unit, and other morphemes appear from the right end of the screen of the display unit in a descending order of their degrees of importance. Then, the morphemes gradually disappear from the left end of the screen of the display unit. When all the morphemes of which the degree of importance is not included in the top-N degrees of the importance of the morphemes have been displayed, a movement of the morphemes in which they appear again from the right end of the screen of the display unit in the descending order of their degrees of importance and gradually disappear from the left end of the screen of the display unit is repeated.

By moving morphemes of which the degree of importance is not included in the top-N degrees of importance of the morphemes on the screen and allowing other morphemes to appear in succession on the screen as described above, it is possible to display the morphemes that cannot be displayed by the information processing method disclosed in Japanese Unexamined Patent Application Publication No. 2012-212254, and thus a user can find the overlooked morphemes.

Here, N and n, which are the higher numbers of degrees of importance of the morphemes, may be set in advance, or may be input by a user via the client terminal 12. Further, the movement of the morpheme may be fast-forwarded, rewound, or stopped by a user operating the client terminal 12. Further, the screen of the display unit may be stored as a screen shot by a user operating the client terminal 12.

Note that in this example embodiment, the morphemes of which the degree of importance is not included in the top-N degrees of importance of the morphemes are displayed at the upper and the lower ends of the screen of the display unit and then moved to the left, but they may instead be displayed at the left and the right ends of the screen of the display unit and then moved to the upper or the lower side thereof. Further, the morphemes of which the degree of importance is not included in the top-N degrees of importance of the morphemes may be moved in the oblique direction of the screen of the display unit. In short, the position and the display style for displaying the morphemes of which the degree of importance is not included in the top-N degrees of importance of the morphemes are not limited.

Figure 12:
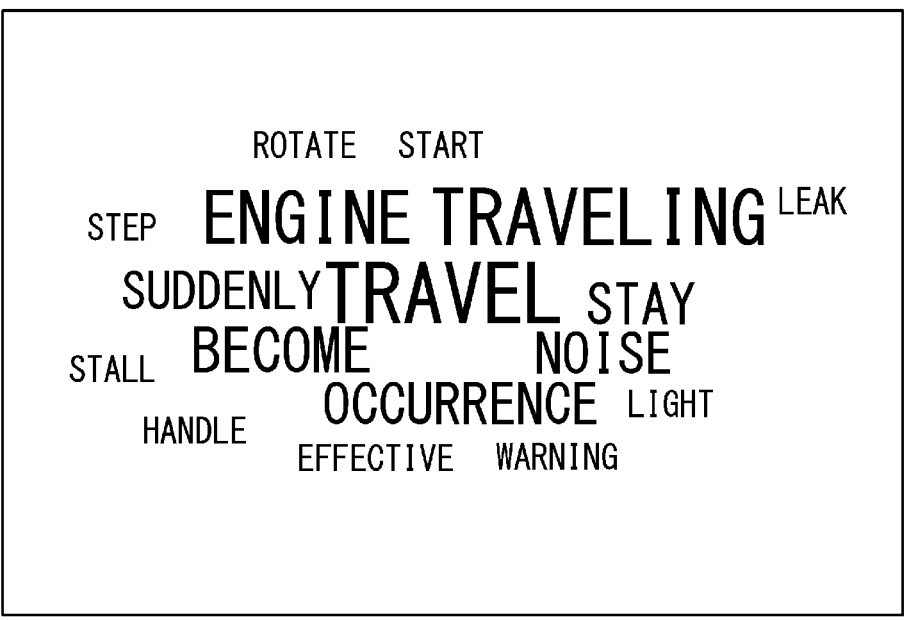
FIG. 12 is a diagram illustrating another movement of the morpheme displayed on the screen of the display unit.
Figure 13:
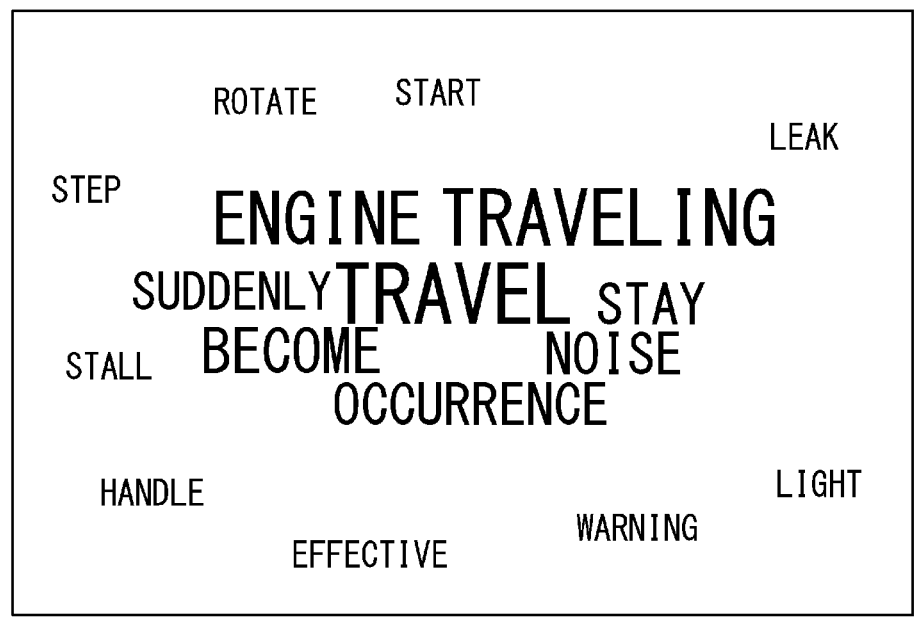
FIG. 13 is a diagram illustrating the other movement of the morpheme displayed on the screen of the display unit.
Figure 14:
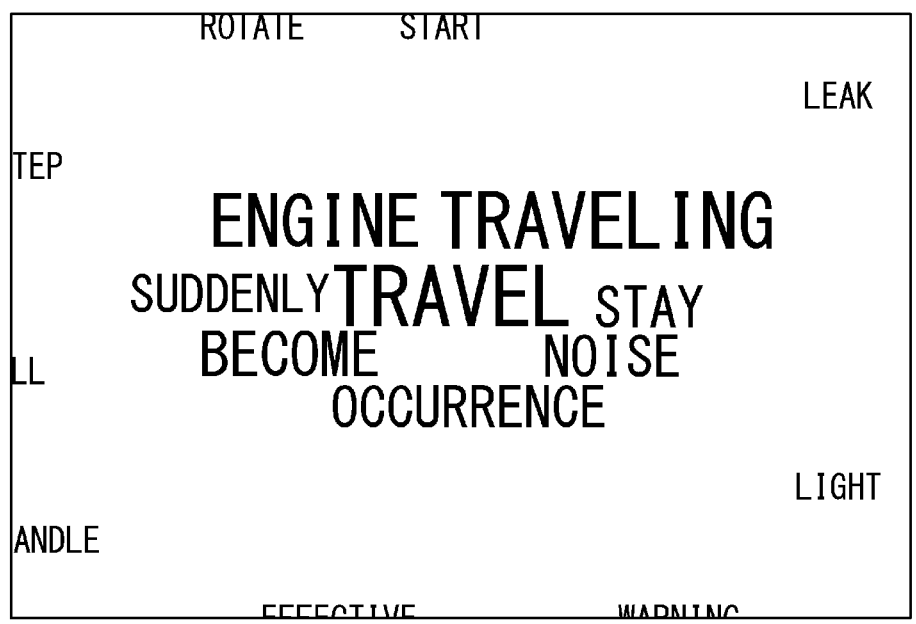
FIG. 14 is a diagram illustrating the other movement of the morpheme displayed on the screen of the display unit.
Figure 15:
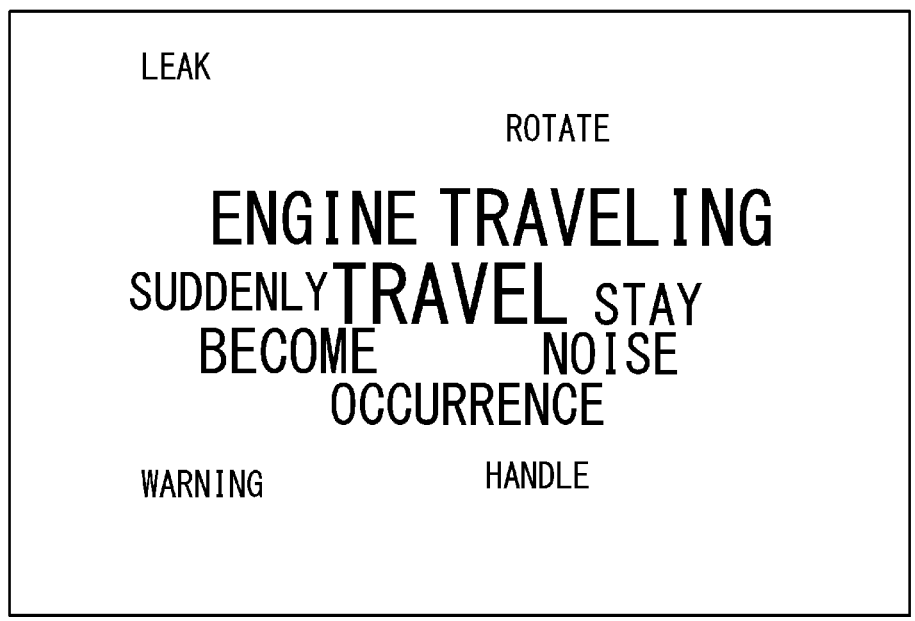
FIG. 15 is a diagram illustrating another new movement of the morpheme displayed on the screen of the display unit.
Figure 16:
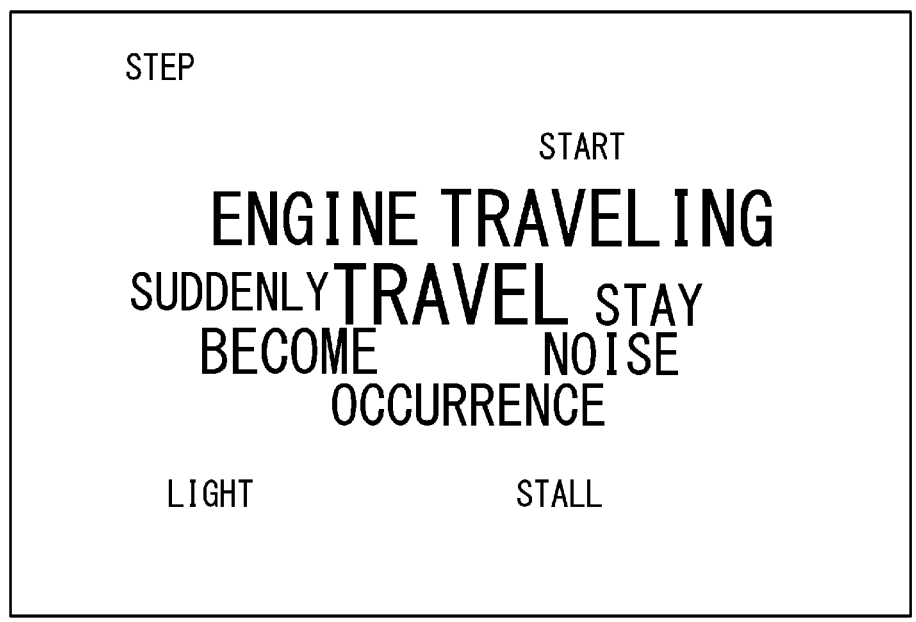
FIG. 16 is a diagram illustrating the other new movement of the morpheme displayed on the screen of the display unit.

For example, as shown in FIGS. 12 to 14, the morphemes of which the degree of importance is not included in the top-N degrees of importance of the morphemes may be moved from the center of the screen of the display unit toward the outside thereof so that they are diverged, and then displayed in a descending order of their degrees of importance. Further, as shown in FIGS. 15 and 16, the morphemes of which the degree of importance is not included in the top-N degrees of importance may be displayed so that they replace each other.

Further, in this example embodiment, the morphemes of which the degree of importance is included in the top-N degrees of importance of the morphemes are stopped and displayed, and the morphemes of which the degree of importance is not included in the top-N degrees of importance of the morphemes are moved and displayed, but instead all the morphemes may be moved and displayed. In this case, for example, the morpheme may be disposed in the following manner: the higher the degree of importance of the morpheme is, the closer it is to the center of the screen, and then displayed in the following manner: the higher the degree of importance of the morpheme is, the slower it is moved on a line connecting one end of the screen to the other end thereof. Further, the morpheme may be disposed in the following manner: the higher the degree of importance of the morpheme is, the closer it is to the upper side of the screen, and then displayed in the following manner: the higher the degree of importance of the morpheme is, the slower it is moved on a line connecting one end of the screen to the other end thereof.

Third Example Embodiment

In the second example embodiment, individual morphemes are displayed as a morpheme group on the screen of the display unit. Meanwhile, in this example embodiment, a subgraph is displayed as a morpheme group on the screen of the display unit. Here, a morpheme group display system and an information processing apparatus according to this example embodiment are the same as the morpheme group display system 11 and the information processing apparatus 22 according to the second example embodiment, and the processes performed by the morpheme group display system and the information processing apparatus according to this example embodiment are the same as those performed by the morpheme group display system 11 and the information processing apparatus 22 except that the morpheme group display system and the information processing apparatus according to this example embodiment process a subgraph instead of individual morphemes, and thus redundant descriptions will be omitted.

Figure 17:
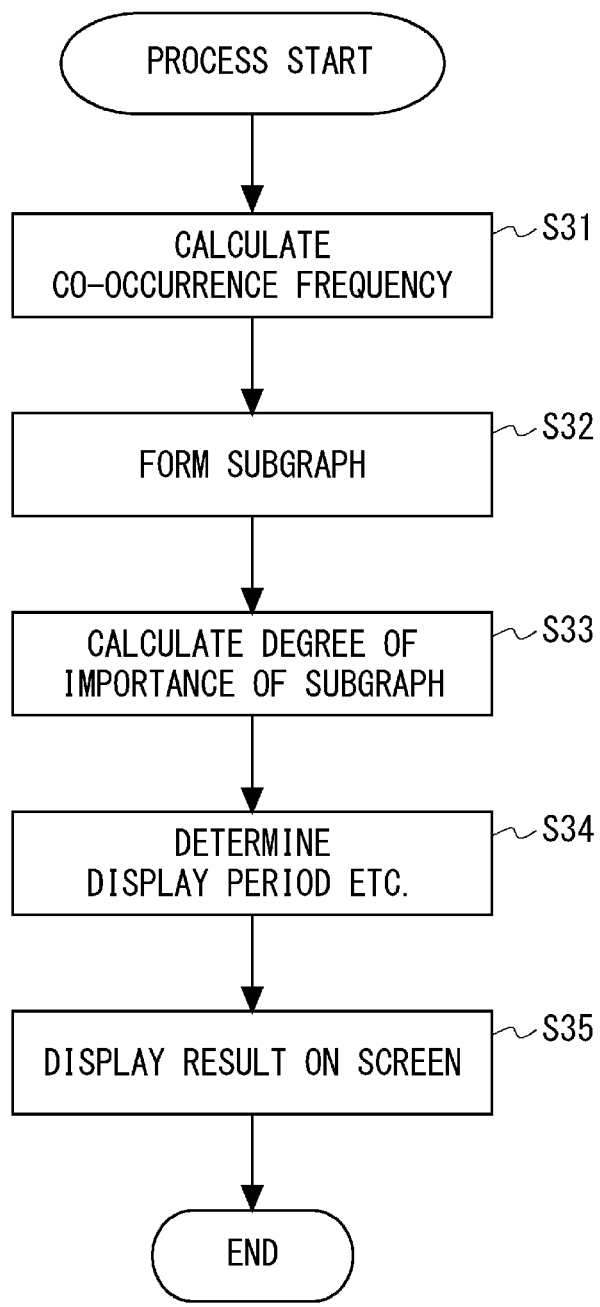
FIG. 17 is a flowchart showing a flow of displaying a subgraph by using a morpheme group display system according to a third example embodiment.

FIG. 17 is a flowchart showing a flow of displaying a morpheme group (a subgraph) by using the morpheme group display system according to this example embodiment. First, when a user requests a display of a morpheme group via the client terminal, the morpheme analysis unit acquires document data indicating the document transmitted from the client terminal stored in the document storage unit of the server, and performs a morpheme analysis on the document indicated by the acquired document data. Next, the morpheme analysis unit calculates a co-occurrence frequency based on the document indicated by the acquired document data and the morphemes divided by the morpheme analysis (S31). Then, the morpheme analysis unit forms a subgraph based on the calculated co-occurrence frequency (S32).

Figure 18:
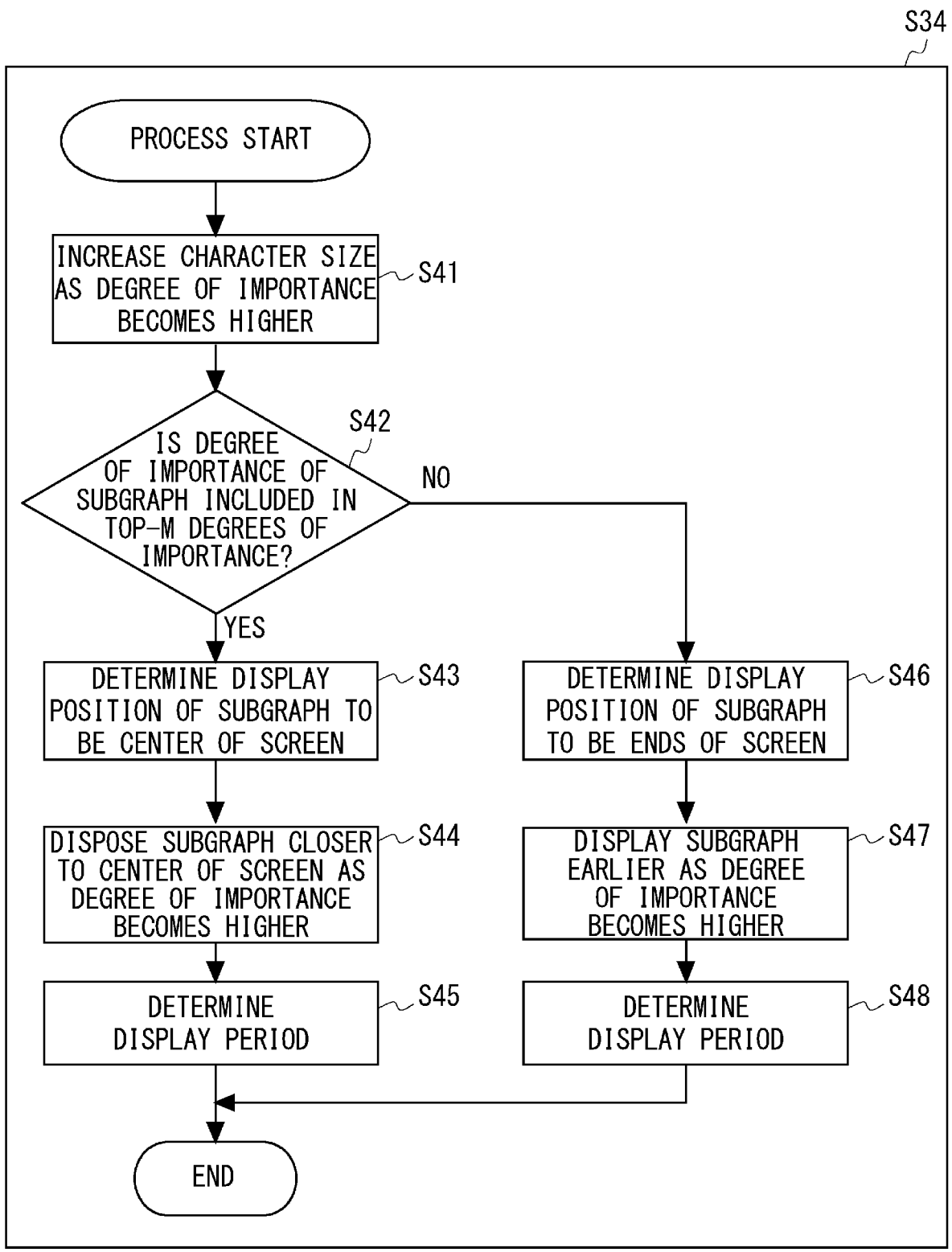
FIG. 18 is a flowchart showing a flow of determining a display period and the like of the subgraph.

Next, the importance degree calculation unit calculates an average value of the degrees of importance of the morphemes included in the formed subgraph (S33). That is, the importance degree calculation unit sets the degree of importance of the subgraph to the average value of the degrees of importance of the morphemes included in the subgraph. Then, a display period and the like of the subgraph are determined for each subgraph based on the calculated average value of the degrees of importance of the morphemes (S34). Here, a specific flow of Step S34 for determining a display period and the like of the subgraph is described. FIG. 18 is a flowchart showing the flow of determining a display period and the like of the subgraph.

First, based on the degree of importance of each morpheme included in the subgraph that is calculated when the degree of importance of the subgraph is calculated, the size determination unit determines a character size of the morpheme in the following manner: the higher the degree of importance of the morpheme is, the larger it is displayed on the screen of the display unit (S41).

Next, the display position determination unit determines whether the calculated degree of importance of the subgraph is included in the top-M degrees of importance of the subgraphs (S42), and if it is determined that the calculated degree of importance of the subgraph is included in the top-M degrees of importance of the subgraphs (YES in S42), the display position determination unit determines a display position of this subgraph to be the center of the screen of the display unit (S43). Here, M can be appropriately changed in accordance with the screen size of the display unit of the client terminal 12.

Next, the display position determination unit determines the display position of each subgraph in the following manner: the higher the degree of importance of the subgraph is, the closer it is displayed to the center of the screen of the display unit (S44). Then, the display period determination unit determines a display period of each subgraph of which the degree of importance is included in the top-M degrees of importance of the subgraphs so that it is always displayed on the screen of the display unit (S45).

Meanwhile, if it is determined that the calculated degree of importance of the subgraph is not included in the top-M degrees of importance of the subgraphs (NO in S42), the display position determination unit determines the display position of this subgraph to be the ends of the screen of the display unit, and determines a display style of the subgraph, for example, the direction in which the subgraph is moved on the screen of the display unit (S46).

Next, the display order determination unit determines, based on the respective degrees of importance of the subgraphs that are not included in the top-M degrees of importance of the subgraphs, a display order of the subgraphs in the following manner: the higher the degree of importance of the subgraph is, the earlier the subgraph is displayed (S47). Then, the display period determination unit determines a display period of each of the subgraphs that are not included in the top-M degrees of importance of the subgraphs from when it appears from one end of the screen of the display unit to when it disappears at the other end thereof (S48). At this time, the display period determination unit determines, based on the degrees of importance of the subgraphs that are not included in the top-M degrees of importance of the subgraphs, the display period of each of the subgraphs in the following manner: the higher the degree of importance of the subgraph is, the slower the subgraph is moved.

Result data indicating the character size of the morpheme, the display position, the display style, the display order, and the display period of the subgraph determined as described above is transmitted to the client terminal via the communication unit. Then, based on the result data, the client terminal displays the subgraph on the screen of the display unit, for example, as follows (S35).

Figure 19:
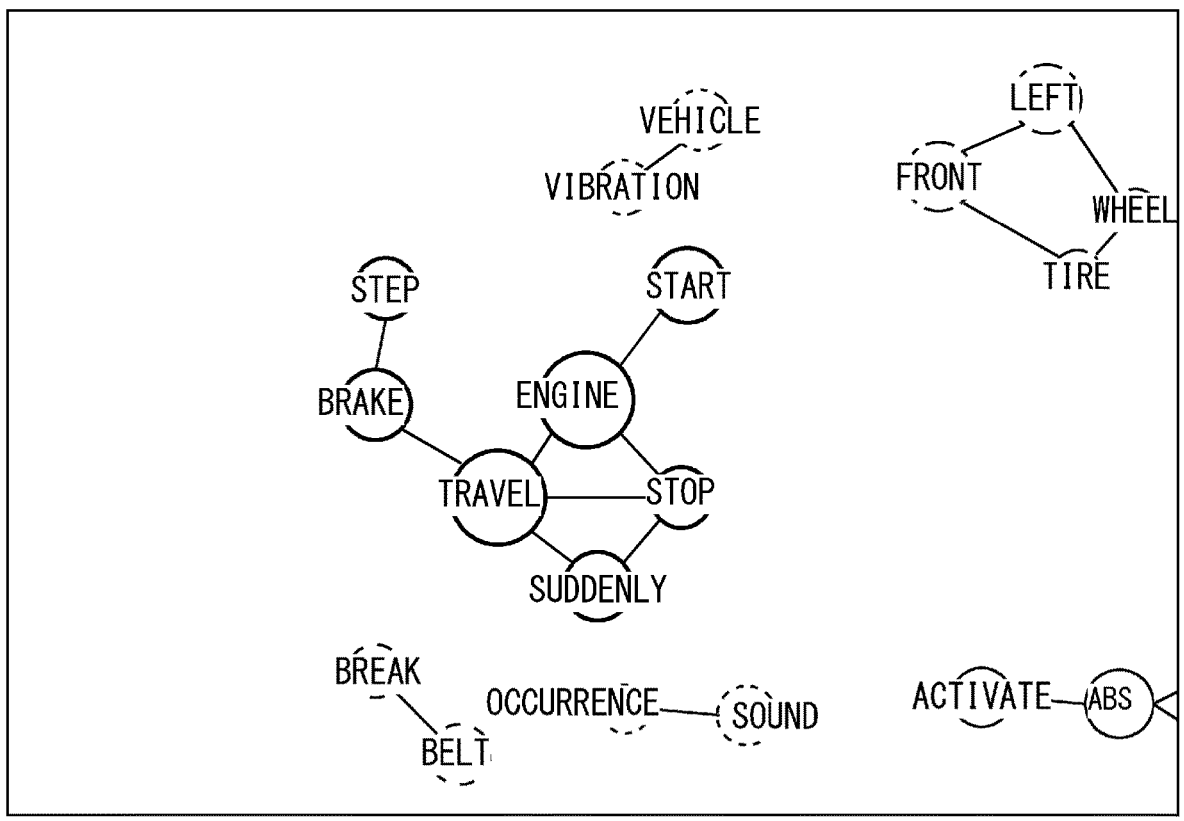
FIG. 19 is a diagram illustrating a movement of the subgraph displayed on the screen of the display unit.
Figure 20:
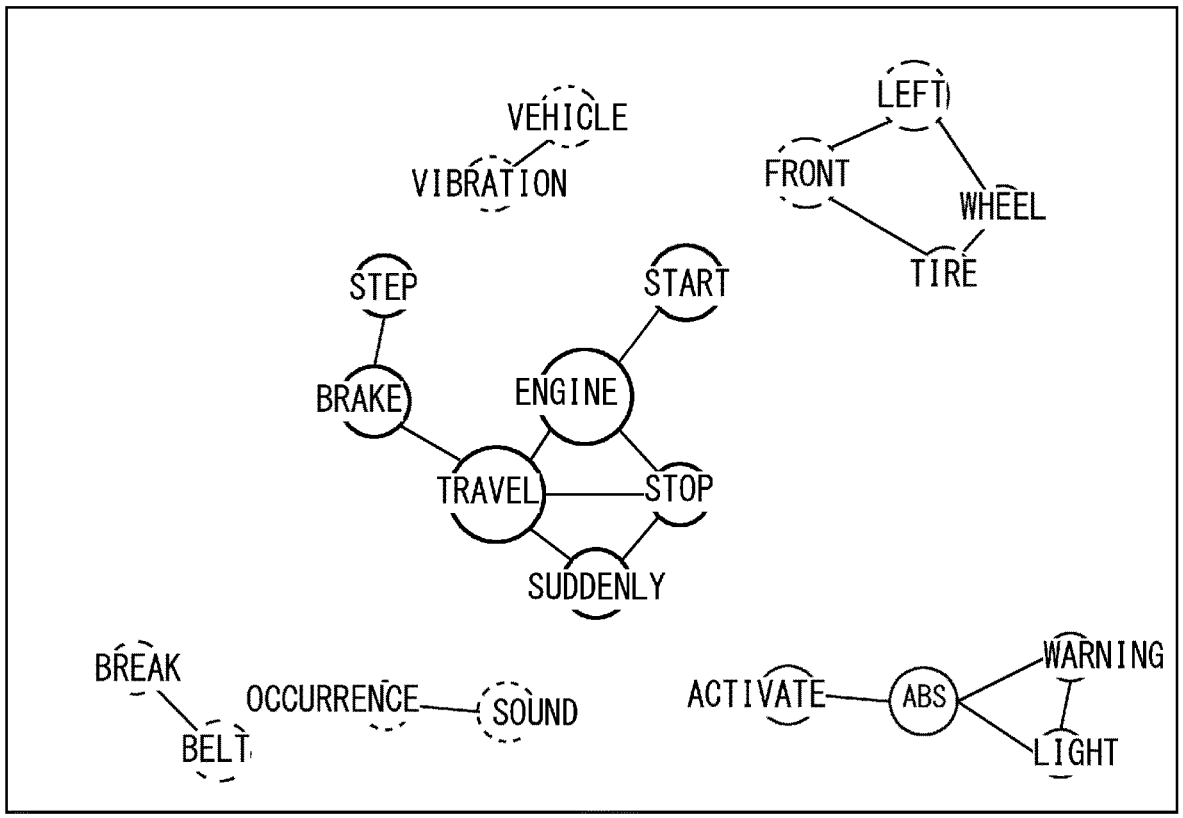
FIG. 20 is a diagram illustrating the movement of the subgraph displayed on the screen of the display unit.
Figure 21:
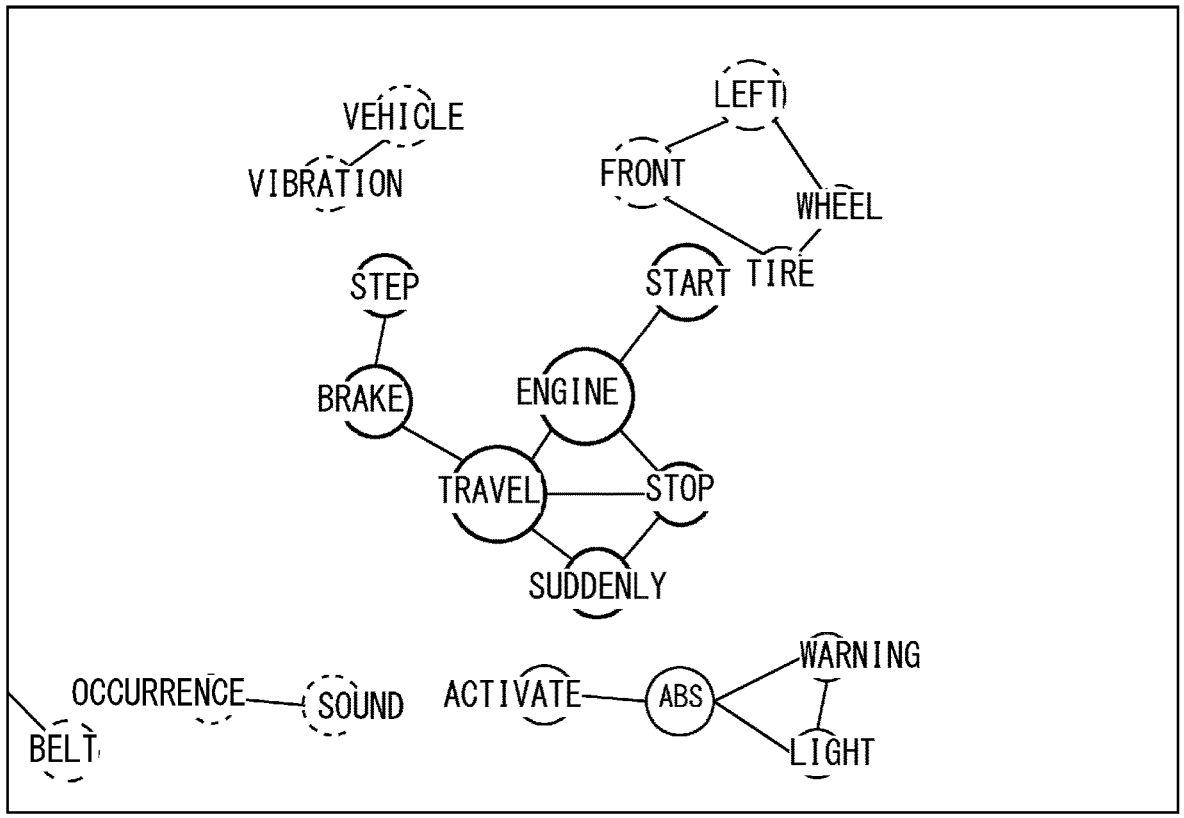
FIG. 21 is a diagram illustrating the movement of the subgraph displayed on the screen of the display unit.

Each of FIGS. 19 to 21 is a diagram illustrating a movement of the subgraph displayed on the screen of the display unit. The subgraph is displayed as a block of morphemes connected to each other by lines, and for example, as shown in FIGS. 19 to 21, the subgraph of "engine, start, travel, stop, suddenly, brake, step", which is a subgraph of which the degree of importance is included in the top-M degrees of importance of the subgraphs, is disposed at substantially the center of the screen of the display unit. The aforementioned subgraph of which the degree of importance is included in the top-M degrees of importance of the subgraphs is not moved.

Meanwhile, the subgraph of "vehicle, vibration" and the like, which are subgraphs of which the degree of importance is not included in the top-M degrees of importance of the subgraphs, are disposed at the upper end or the lower end of the screen of the display unit. Then, at the time of starting the display, the subgraphs of which the degree of importance is included in the top-m degrees of the subgraphs of which the degree of importance is not included in the top-M degrees of importance of the subgraphs, which are the subgraph of "vehicle, vibration" and the like, are displayed on the screen of the display unit. Here, m can be appropriately changed in accordance with the screen size of the display unit of the client terminal 12.

After that, these subgraphs are moved toward the left end of the screen of the display unit, and other subgraphs (e.g., the subgraph of "ABS, activate, light, warning") appear from the right end of the screen of the display unit in a descending order of their degree of importance. Then, the subgraphs gradually disappear from the left end of the screen of the display unit. When all the subgraphs of which the degree of importance is not included in the top-M degrees of the importance of the subgraphs have been displayed, a movement of the subgraphs in which they appear again from the right end of the screen of the display unit in the descending order of their degree of importance and gradually disappear from the left end of the screen of the display unit is repeated.

At this time, for example, the morpheme of "start" in the subgraph of "engine, start, travel, stop, suddenly, brake, step" and the morpheme of "tire" in the subgraph of "front, left, tire, wheel" are about to overlap each other. Therefore, the subgraph of "front, left, tire, wheel" may be rotated around its center of gravity just before they are about to overlap each other. This enables this subgraph to be easily visible to a user.

As described above, in this example embodiment, as the subgraph is displayed as the morpheme group on the screen of the display unit, the relation between the morphemes based on statistical processing can be visualized. This makes it possible for the user to understand the document contents better than when the morphemes are individually displayed.

In this example embodiment, the average value of the degrees of importance of the morphemes included in the subgraph is used as the degree of importance of the subgraph, but the maximum or the minimum value of the degree of importance of the morpheme included in the subgraph may instead be used as the degree of importance of the sub graph.

Further, in this example embodiment, in the process of S42, it is determined whether the degree of importance of the subgraph is included in the top-M degrees of importance of the subgraphs, but it may instead be determined whether a cumulative sum of the number of morphemes obtained by adding the number of morphemes included in each of the subgraphs in order from the morphemes included in the subgraph having the highest degree of importance exceeds L.

That is, the number of morphemes included in each of the subgraphs is added in order from the morphemes included in the subgraph having the highest degree of importance, and the subgraphs of which the result of the addition does not exceed L are processed in the same manner that the aforementioned subgraphs of which the degree of importance is included in the top-M degrees of importance of the subgraphs are processed. In this example, L is 30, but it can instead be changed appropriately.

Note that in this example embodiment, the subgraphs of which the degree of importance is not included in the top-M degrees of importance of the subgraphs are displayed at the upper and the lower end of the screen of the display unit and then moved to the left, but the position and the display style for displaying the subgraphs of which the degree of importance is not included in the top-M degrees of importance of the subgraphs are not limited. Further, all of the subgraphs may be moved.

Other Example Embodiments

Although the present disclosure has been described as a hardware configuration in the above first to third example embodiments, the present disclosure is not limited thereto. In the present disclosure, it is also possible to implement processing of each component by causing a Central Processing Unit (CPU) to execute a computer program.

Figure 22:
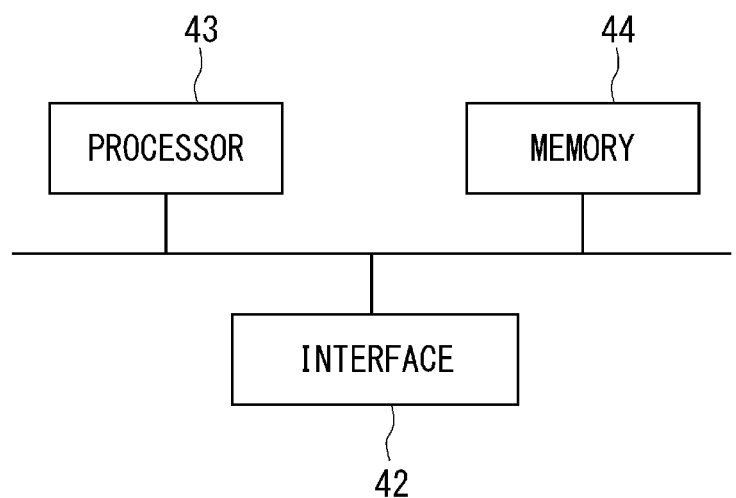
FIG. 22 is a diagram showing an example of a hardware configuration included in the information processing apparatus.

For example, the information processing apparatus 22 according to the above example embodiment may have the following hardware configuration. FIG. 22 is a diagram showing an example of the hardware configuration included in the information processing apparatus 22.

An apparatus 41 shown in FIG. 22 includes an interface 42, a processor 43, and a memory 44. The information processing apparatus 22 described in the above example embodiment is implemented by the processor 43 loading and executing a program stored in the memory 44. That is, this program is a program for causing the processor 43 to function as the information processing apparatus 22 shown in FIG. 5.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, the above example embodiments are merely examples of applications of the technical ideas obtained by the inventor. These technical ideas are not limited to the above example embodiments and various modifications can be made thereto.

Figure 23:
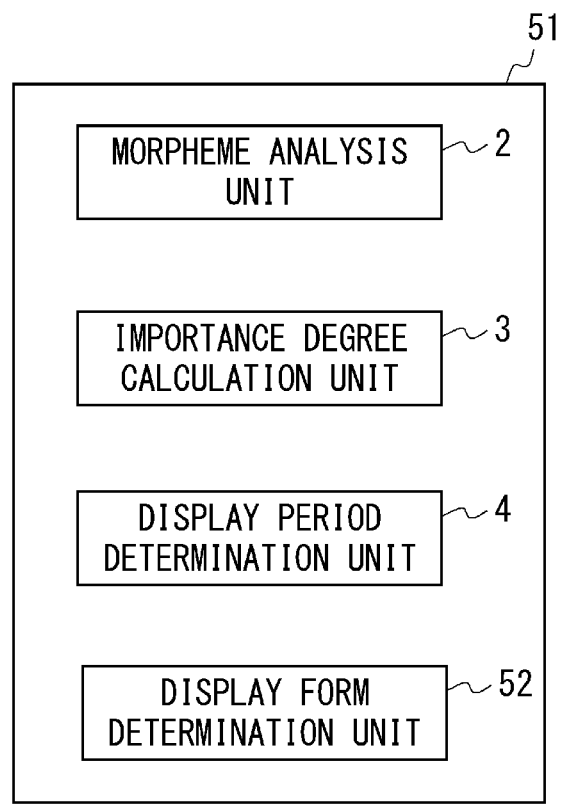
FIG. 23 is a block diagram of the information processing apparatus having another form.

For example, as shown in FIG. 23, the information processing apparatus 51 may include, in addition to the morpheme analysis unit 2, the importance degree calculation unit 3, and the display period determination unit 4 described above, a display form determination unit 52 that determines, based on the degree of importance of the morpheme group, a color of the morpheme group, lightness thereof, a shade thereof, and a font thereof, a thickness of each of characters composing the morpheme group, or a figure that surrounds the characters composing the morpheme group when the morpheme group is displayed on the screen of the display unit.

The whole or part of the example embodiments disclosed above can be described as, but not limited to, the following supplementary notes.

(Supplementary Note 1)

An information processing apparatus comprising:

a morpheme analysis unit configured to analyze a morpheme group included in a document;

an importance degree calculation unit configured to calculate a degree of importance of the morpheme group; and a display period determination unit configured to determine, based on the degree of importance of the morpheme group, a display period of the morpheme group when the morpheme group is displayed on a display unit.

(Supplementary Note 2)

The information processing apparatus described in Supplementary note 1, further comprising a size determination unit configured to determine, based on the degree of importance of the morpheme group, a display size of the morpheme group when the morpheme group is displayed on the display unit, wherein the size determination unit determines the display size in the following manner: the higher the degree of importance of the morpheme group is, the larger the display size becomes.

(Supplementary Note 3)

The information processing apparatus described in Supplementary note 1 or 2, further comprising a display position determination unit configured to determine, based on the degree of importance of the morpheme group, a display position of the morpheme group when the morpheme group is displayed on the display unit, wherein the display position determination unit determines the display position of the morpheme group in the following manner: the higher the degree of importance of the morpheme group is, the closer the display position is to a center of the display unit.

(Supplementary Note 4)

The information processing apparatus described in any one of Supplementary notes 1 to 3, wherein the display period determination unit determines the display period of the morpheme group in the following manner: the higher the degree of importance of the morpheme group is, the longer the display period becomes.

(Supplementary Note 5)

The information processing apparatus described in any one of Supplementary notes 1 to 4, further comprising a display order determination unit configured to determine, based on the degree of importance of the morpheme group, a display order of the morpheme group when the morpheme group is displayed on the display unit, wherein the display order determination unit determines the display order of the morpheme group in the following manner: the higher the degree of importance of the morpheme group is, the earlier the morpheme group is displayed.

(Supplementary Note 6)

The information processing apparatus described in any one of Supplementary notes 1 to 5, further comprising a display form determination unit configured to determine, based on the degree of importance of the morpheme group, a color of the morpheme group, lightness thereof, a shade thereof, and a font thereof, a thickness of each of characters composing the morpheme group, or a figure that surrounds the characters composing the morpheme group when the morpheme group is displayed on the display unit.

(Supplementary Note 7)

A morpheme group display system comprising:

the information processing apparatus described in any one of Supplementary notes 1 to 6; and a client terminal comprising a display unit configured to display a morpheme group included in a document input by a user based on a display period determined by the information processing apparatus, the client terminal being connected to the information processing apparatus so that data can be transmitted and received therebetween.

(Supplementary Note 8)

An information processing method comprising:

analyzing a morpheme group included in a document;

calculating a degree of importance of the morpheme group; and determining, based on the degree of importance of the morpheme group, a display period of the morpheme group when the morpheme group is displayed on a display unit.

(Supplementary Note 9)

The information processing method described in Supplementary note 8, further comprising determining, based on the degree of importance of the morpheme group, a display size of the morpheme group when the morpheme group is displayed on the display unit, wherein in the determination of the display size of the morpheme group, the display size of the morpheme group is determined in the following manner: the higher the degree of importance of the morpheme group is, the larger the display size becomes.

(Supplementary Note 10)

The information processing method described in Supplementary note 8 or 9, further comprising determining, based on the degree of importance of the morpheme group, a display position of the morpheme group when the morpheme group is displayed on the display unit, wherein in the determination of the display position of the morpheme group, the display position of the morpheme group is determined in the following manner: the higher the degree of importance of the morpheme group is, the closer the display position is to a center of the display unit.

(Supplementary Note 11)

The information processing method described in any one of Supplementary notes 8 to 10, wherein in the determination of the display period of the morpheme group, the display period of the morpheme group is determined in the following manner: the higher the degree of importance of the morpheme group is, the longer the display period becomes.

(Supplementary Note 12)

The information processing method described in any one of Supplementary notes 8 to 11, wherein the display period of the morpheme group is a period from when the morpheme group appears from one end of the display unit to when it reaches the other end of the display unit.

(Supplementary Note 13)

The information processing method described in any one of Supplementary notes 8 to 12, wherein a color of the morpheme group, lightness thereof, a shade thereof, a font thereof, a thickness of each of characters of the morpheme group, or a figure that surrounds the characters of the morpheme group is determined based on the degree of importance of the morpheme group when the morpheme group is displayed on the display unit.

(Supplementary Note 14)

The information processing method described in any one of Supplementary notes 8 to 13, further comprising:

calculating a co-occurrence frequency based on the document and the morphemes included in the document; and forming a subgraph as the morpheme group based on the co-occurrence frequency.

(Supplementary Note 15)

A non-transitory computer readable medium storing an information processing program for causing a computer to:

analyze a morpheme group included in a document;

calculate a degree of importance of the morpheme group; and determine, based on the degree of importance of the morpheme group, a display period of the morpheme group when the morpheme group is displayed on a display unit.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. An information processing apparatus configured to, by executing a program:

analyze a morpheme group included in a document;

calculate a degree of importance of the morpheme group;

determine to continuously display, on a display unit, a morpheme group of which a degree of importance is included in the top-N(N is a natural number) degrees of importance of morpheme groups and to move and display, on the display unit, a morpheme group of which the degree of importance is not included in the top-N degrees of importance of the morpheme groups; and determine, based on the degree of importance of the morpheme group not included in the top-N degrees of importance of the morpheme groups, a display period of the morpheme group when the morpheme group not included in the top-N degrees of importance of the morpheme groups is displayed on the display unit.

2. The information processing apparatus according to claim 1, further configured to, by executing the program, determine a display size in the following manner: the higher the degree of importance of the morpheme group is, the larger the display size becomes.

3. The information processing apparatus according to claim 1, further configured to, by executing the program, determine the display position of the morpheme group in the following manner: the higher the degree of importance of the morpheme group is, the closer the display position is to a center of the display unit.

4. The information processing apparatus according to claim 1, further configured to, by executing the program, determine the display period of the morpheme group not included in the top-N degrees of importance of the morpheme groups in the following manner: the higher the degree of importance of the morpheme group not included in the top-N degrees of importance of the morpheme groups is, the longer the display period becomes.

5. The information processing apparatus according to claim 1, further configured to, by executing the program, determine the display order of the morpheme group in the following manner: the higher the degree of importance of the morpheme group not included in the top-N degrees of importance of the morpheme groups is, the earlier the morpheme group not included in the top-N degrees of importance of the morpheme groups is displayed.

6. The information processing apparatus according to claim 1, further configured to, by executing the program, determine, based on the degree of importance of the morpheme group, a color of the morpheme group, lightness thereof, a shade thereof, and a font thereof, a thickness of each of characters composing the morpheme group, or a figure that surrounds the characters composing the morpheme group when the morpheme group is displayed on the display unit.

7. An information processing method comprising:
analyzing a morpheme group included in a document;
calculating a degree of importance of the morpheme group; and
determining to continuously display, on a display unit, a morpheme group of which a degree of importance is included in the top-N(N is a natural number) degrees of importance of morpheme groups and to move and display, on the display unit, a morpheme group of which the degree of importance is not included in the top-N degrees of importance of the morpheme groups; and
determining, based on the degree of importance of the morpheme group not included in the top-N degrees of importance of the morpheme groups, a display period of the morpheme group when the morpheme group not included in the top-N degrees of importance of the morpheme groups is displayed on the display unit.

8. The information processing method according to claim 7, further comprising determining, based on the degree of importance of the morpheme group, a display size of the morpheme group when the morpheme group is displayed on the display unit,
wherein in the determination of the display size of the morpheme group, the display size of the morpheme group is determined in the following manner: the higher the degree of importance of the morpheme group is, the larger the display size becomes.

9. The information processing method according to claim 7, further comprising determining, based on the degree of importance of the morpheme group, a display position of the morpheme group when the morpheme group is displayed on the display unit,
wherein in the determination of the display position of the morpheme group, the display position of the morpheme group is determined in the following manner: the higher the degree of importance of the morpheme group is, the closer the display position is to a center of the display unit.

10. The information processing method according to claim 7, wherein in the determination of the display period of the morpheme group not included in the top-N degrees of importance of the morpheme groups, the display period of the morpheme group not included in the top-N degrees of importance of the morpheme groups is determined in the following manner: the higher the degree of importance of the morpheme group not included in the top-N degrees of importance of the morpheme groups is, the longer the display period becomes.

11. The information processing method according to claim 7, wherein the display period of the morpheme group not included in the top-N degrees of importance of the morpheme groups is a period from when the morpheme group not included in the top-N degrees of importance of the morpheme groups appears from one end of the display unit to when it reaches the other end of the display unit.

12. The information processing method according to claim 7, wherein a color of the morpheme group, lightness thereof, a shade thereof, a font thereof, a thickness of each of characters of the morpheme group, or a figure that surrounds the characters of the morpheme group is determined based on the degree of importance of the morpheme group when the morpheme group is displayed on the display unit.

13. The information processing method according to claim 7, further comprising:
calculating a co-occurrence frequency based on the document and the morphemes included in the document; and
forming a subgraph as the morpheme group based on the co-occurrence frequency.

14. A non-transitory computer readable medium storing an information processing program for causing a computer to:
analyze a morpheme group included in a document;
calculate a degree of importance of the morpheme group; and
determine to continuously display, on a display unit, a morpheme group of which a degree of importance is included in the top-N(N is a natural number) degrees of importance of morpheme groups and to move and display, on the display unit, a morpheme group of which the degree of importance is not included in the top-N degrees of importance of the morpheme groups; and
determine, based on the degree of importance of the morpheme group not included in the top-N degrees of importance of the morpheme groups, a display period of the morpheme group when the morpheme group not included in the top-N degrees of importance of the morpheme groups is displayed on the display unit.

\* \* \* \* \*